US012641367B2

(12) United States Patent
Wirler et al.

(10) Patent No.: US 12,641,367 B2
(45) Date of Patent: May 26, 2026

(54) MICROPHONE SIGNALBEAMFORMING PROCESSING METHOD, ELECTRONIC DEVICE, AND NON-TRANSITORY STORAGE MEDIUM

(71) Applicant: AAC Technologies Pte. Ltd., Singapore (SG)

(72) Inventors: Stefan Albert Wirler, Helsinki (FI); Juha Backman, Tampere (FI)

(73) Assignee: AAC Technologies Pte. Ltd., Singapore (SG)

( * ) Notice: Subject to any disclaimer, the term of this patent is extended or adjusted under 35 U.S.C. 154(b) by 252 days.

(21) Appl. No.: 18/625,253

(22) Filed: Apr. 3, 2024

(65) Prior Publication Data

US 2025/0317685 A1 Oct. 9, 2025

(51) Int. Cl.
*H04R 3/00* (2006.01)
*H04R 1/40* (2006.01)
*H04R 3/04* (2006.01)
*H04R 29/00* (2006.01)

(52) U.S. Cl.
CPC ............. *H04R 3/005* (2013.01); *H04R 1/406* (2013.01); *H04R 3/04* (2013.01); *H04R 29/005* (2013.01); *H04R 2410/01* (2013.01)

(58) Field of Classification Search
CPC ........ H04R 1/326; H04R 1/406; H04R 3/005; H04R 3/04; H04R 29/005; H04R 2410/01; H04R 2201/401; H04R 2201/403; H04R 2201/405; H04R 2430/25; G10K 11/34
USPC ................................ 381/56, 58, 91, 92, 122
See application file for complete search history.

(56) References Cited

U.S. PATENT DOCUMENTS 9,955,277 B1 * 4/2018 Alexandridis ............ H04S 7/30
2013/0142343 A1 * 6/2013 Matsui .................. G10L 21/028
381/71.1
2015/0304766 A1 * 10/2015 Delikaris-Manias .... H04R 1/08
381/92

(Continued)

OTHER PUBLICATIONS

Ngoc, Audio zoom for smartphones based on multiple adaptive beamformers, 2019.*

*Primary Examiner* — William A Jerez Lora
(74) *Attorney, Agent, or Firm* — Viersch Law Group

(57) ABSTRACT

A microphone signal beamforming processing method and related products are provided. The method includes: obtaining a frequency domain signal of each of at least three microphones by performing time-frequency transforming on first output signals, and performing a plurality of different groups of beamforming preprocessing on the frequency domain signals; performing a plurality of different groups of cross-pattern analysis on the plurality of beam signals to obtain a plurality of positive weighting coefficients, multiplying the plurality of positive weighting coefficients to obtain a combined coefficient, and multiplying the combined coefficient with the frequency domain signal of any one of the at least three microphones to obtain a weighted spectral component; and performing inverse time-frequency transforming on the weighted spectral component. In the disclosure, channel separation is better achieved using combined cross-pattern analysis than using traditional methods, resulting in narrower beams with excellent sidelobe suppression and higher signal-to-noise ratio.

14 Claims, 6 Drawing Sheets

(56) References Cited

U.S. PATENT DOCUMENTS

| | | | | |
|---|---|---|---|---|
| 2017/0061983 | A1* | 3/2017 | Rasmussen .......... | H04R 1/1083 |
| 2020/0066249 | A1* | 2/2020 | Christoph ........ | G10K 11/17861 |

* cited by examiner

MICROPHONE SIGNALBEAMFORMING PROCESSING METHOD, ELECTRONIC DEVICE, AND NON-TRANSITORY STORAGE MEDIUM

TECHNICAL FIELD

The various embodiments described in this document relate in general to the technical field of microphone signal processing, and more specifically to a microphone signal beamforming processing method, an electronic device, and a storage medium.

BACKGROUND

The most widely used beamformers are delay-sum and differential beamformers, which can be implemented using fixed or adaptive polar patterns. The more advanced group of beamformers uses these as a starting point, but adds a postfilter, usually implemented as a frequency domain sub-band filter, to further suppress sidelobes, reverberation, and background noise.

Traditional beamforming methods suffer from performance compromises related to system size, dynamic range (especially noise gain due to beamforming), sidelobe suppression, polar pattern frequency independence etc. The postfiltering schemes used so far use simple processing that limits the flexibility in the beam control and does not allow narrow beams.

SUMMARY

Embodiments of the disclosure aims at providing a microphone signal beamforming processing method, an electronic device, and a storage medium, which can solve the problem that the traditional beamforming method suffer from beam performance compromises and does not allow narrow beams.

To solve above technical problems, embodiments of the disclosure provide a microphone signal beamforming processing method, including: obtaining a frequency domain signal of each of at least three microphones by performing time-frequency transforming on a first output signal of each of the at least three microphones to obtain frequency domain signals, and performing a plurality of different groups of beamforming preprocessing on the frequency domain signals to obtain a plurality of different beam signals; performing a plurality of different groups of cross-pattern analysis on the plurality of beam signals to obtain a plurality of positive weighting coefficients, where each of the positive weighting coefficients is indicative of similarity between at least two beams signals, among the plurality of beam signals, for a corresponding group of cross-pattern analysis; multiplying the plurality of positive weighting coefficients to obtain a combined coefficient, and multiplying the combined coefficient with the frequency domain signal of any one of the at least three microphones to obtain a weighted spectral component; and performing inverse time-frequency transforming on the weighted spectral component to obtain a second output signal corresponding to the at least three microphones.

Embodiments of the disclosure further provide an electronic device, including at least one processor; and a memory in communication with the at least one processor. The memory stores instructions executable by the at least one processor, and the instructions, when executed by the at least one processor, cause the at least one processor to perform the microphone signal beamforming processing method as described above.

Embodiments of the disclosure further provide a non-transitory computer-readable storage medium having a computer program stored therein. The above method embodiments are implemented when a computer program is executed by a processor.

Compared with the related technologies, in the microphone signal beamforming processing method of the embodiments, time-frequency transforming is performed on output signals of the plurality of microphones to obtain the frequency domain signals, and beamforming processing is performed on the frequency domain signals to obtain beam signals. Thereafter, the similarity of different beam signals is compared based on multiple groups of cross-pattern analysis, such that multiple positive weighting coefficients are obtained. The weighted spectral component is obtained by multiplying the positive weighting coefficients with the frequency domain signal of any microphone. In the disclosure, channel separation is better achieved using combined cross-pattern analysis than using traditional methods, resulting in narrower beams with excellent sidelobe suppression and higher signal-to-noise ratio.

In addition, a distance between each two microphones of the at least three microphones is less than half of a wavelength corresponding to a highest frequency in a target application scenario.

In addition, obtaining the frequency domain signal of each of the at least three microphones by performing the time-frequency transforming on the first output signal of each of the at least three microphones to obtain the frequency domain signals includes: performing, by each respective time-frequency transforming module of a plurality of time-frequency transforming modules that are in one-to-one correspondence with the at least three microphones, the time-frequency transforming on a first output signal of a respective microphone to obtain the frequency domain signal of the respective microphone.

In addition, performing the plurality of different groups of beamforming preprocessing on the frequency domain signals to obtain the plurality of beam signals includes: performing, by at least two beamformers, the plurality of different groups of beamforming preprocessing on the frequency domain signals, including: performing, by each of the at least two beamformers, a corresponding group of beamforming preprocessing on frequency domain signals output from at least three time-frequency transforming modules of the plurality of time-frequency transforming modules to obtain a beam signal.

In addition, each beamformer is a steerable beamformer, and the beam signals formed by the at least two beamformers have different widths and/or directions.

In addition, performing the plurality of different groups of cross-pattern analysis on the plurality of beam signals to obtain the plurality of positive weighting coefficients includes: performing, by two cross-pattern analysis modules, measuring and calculation on correlation and/or coherence between the plurality of beam signals respectively to obtain the plurality of positive weighting coefficients.

In addition, the method further includes before multiplying the combined coefficient with the frequency domain signal of any one of the at least three microphones, performing gain normalization processing on the combined coefficient based on a gain normalization factor and a floor value for selectively suppressing inputs in a direction of cross-mode similarity less than a predetermined threshold to obtain a desired gain towards a main lobe direction of a generated beam.

In addition, performing the plurality of different groups of beamforming preprocessing on the frequency domain signals, performing the plurality of different groups of cross-pattern analysis on the plurality of beam signals, multiplying the plurality of positive weighting coefficients to obtain the combined coefficient, multiplying the combined coefficient with the frequency domain signal of any one of the at least three microphones to obtain the weighted spectral component, and performing the inverse time-frequency transforming on the weighted spectral component include the following. Each of the frequency domain signals is divided into a plurality of parts that are respectively falls into a plurality of frequency widows, where the plurality of frequency widows are determined according to a sampling frequency for the first output signals and a length of each time-frequency transforming module. For each respective frequency widow of the plurality of frequency widows, the plurality of different groups of beamforming preprocessing are performed on part of each of the frequency domain signals belonging to the respective frequency window to obtain a plurality of different first beam signals, the plurality of different groups of cross-pattern analysis are performed on the plurality of first beam signals to obtain a plurality of first positive weighting coefficients, and the plurality of first positive weighting coefficients are multiplied to obtain a first combined coefficient, and the first combined coefficient is multiplied with part of the frequency domain signal of any one of the microphones belonging to the respective frequency window to obtain a first weighted spectral component. The inverse time-frequency transforming is performed on combined first weighted spectral components corresponding to the plurality of frequency widows to obtain the second output signal corresponding to the at least three microphones.

BRIEF DESCRIPTION OF THE DRAWINGS

One or more embodiments are illustrated by the pictures in the corresponding drawings, which are not to be limiting to the embodiments, and elements having the same reference numerals in the drawings are represented as similar elements, and the figures in the drawings are not to be scale limiting unless otherwise stated.

DETAILED DESCRIPTION OF THE EMBODIMENTS

Figure 1:
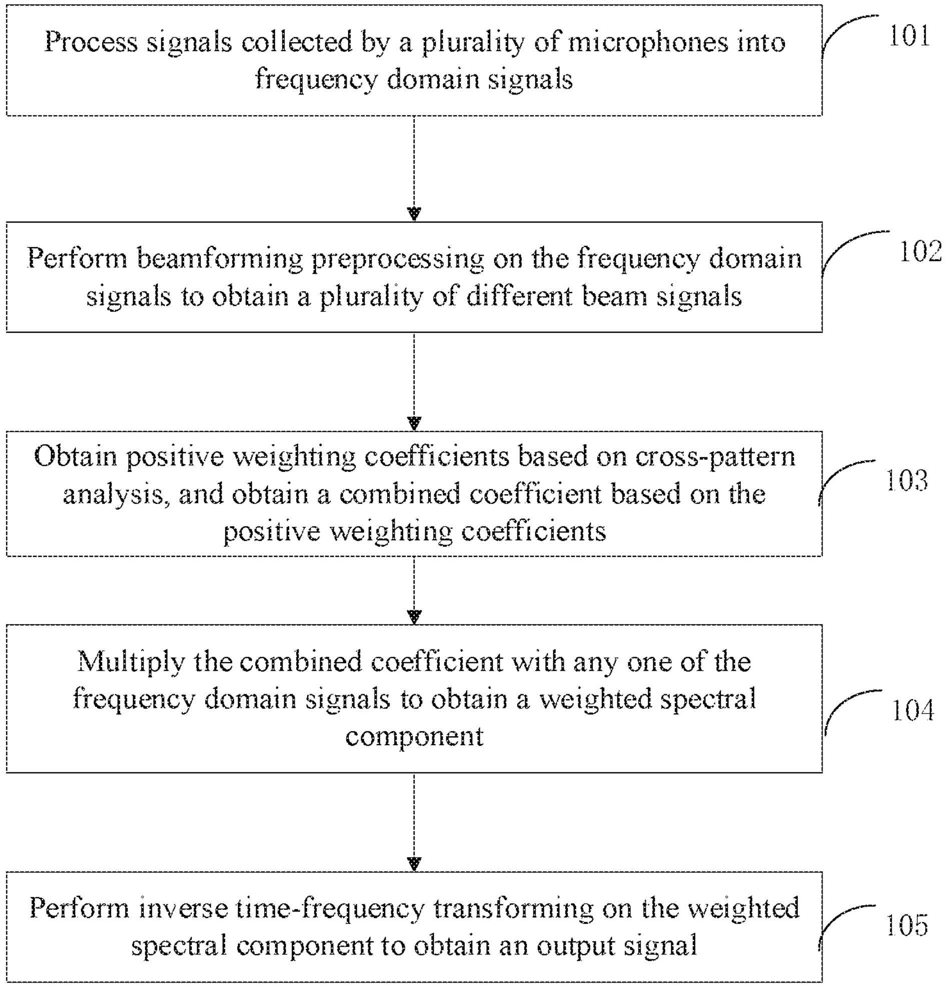
FIG. 1 is a flow chart of a microphone signal beamforming processing method according to embodiments of the present disclosure.

In order to make the object, technical scheme, and advantages of the embodiments of the present disclosure clearer, embodiments of the present disclosure will be described in detail below with reference to the accompanying drawings. However, one of ordinary skill in the art will appreciate that in various embodiments of the present disclosure, numerous technical details have been presented in order to enable the reader to better understand the present disclosure. However, even without these technical details and various variations and modifications based on the following embodiments, the claimed technical solutions of the present disclosure can be realized. The division of following embodiments is used for the convenience of description and should not be defined in any way as to the specific implementation of the present disclosure. The embodiments may be referred to each other in conjunction without contradiction.

The "and/or" in embodiments of the disclosure describe an association relationship of the associated objects, indicating that three kinds of relationships can exist. For example, A and/or B can represent the following three situations: A exists alone; both A and B exist; B exist alone, where A and B can be in a singular or plural form.

In embodiments of the present disclosure, the symbol "/" may indicate an "or" relationship between related objects. In addition, the symbol "/" can also indicate a division sign, that is, a division operation is performed. For example, A/B can mean A divided by B.

In embodiments of the disclosure, symbols "*", "·" or "×" can denote a multiplication sign, that is, a multiplication operation is performed. For example, A*B, A·B, or A×B can mean A multiplied by B.

The technical proposal, beneficial effects, and related concepts related to the embodiments of the disclosure are described in detail below.

It is to be noted that embodiments of the present disclosure provide a microphone signal beamforming processing method, which may be applied to any microphone device or other audio signal sensors. In some possible implementations, the method is applied to a single closely spaced transducer groups, and devices where this can be used include: portable devices such as mobile phones and tablet computers; single device, multiple microphone units for teleconferencing systems (with or without an embedded loudspeaker) or internet-enabled smart speakers; "single point" stereo or surround recording microphones (for example camera accessory microphones), or the like. In other possible implementations, the method is used to implement beamforming when multiple separate microphone groups are used, examples of which include: spatially separated microphone groups on a same device, such as AR/VR/XR/Telepresence glasses with microphone groups on both sides, wearable wireless headsets, hearing devices (hearing aids) and augmented hearing systems; combining several teleconference devices near each other; combining the signal from multiple microphone groups in a car cabin. In other possible implementations, the method can be used in controlling an acoustic zoom; combining acoustical beam control with visual target recognition or control through image-based user interface; and controlling the acoustical beam with eye tracking, especially in wearable devices.

Embodiments of the disclosure relate to a microphone signal beamforming processing method. The key part of the embodiments is that first output signals respectively output from a plurality of microphones including at least three microphones, are subjected to time-frequency transforming to obtain frequency domain signals, and the frequency domain signals of the plurality of microphones are subjected to different groups of beamforming preprocessing to obtain a plurality of different beam signals. A plurality of groups of cross-pattern analysis are performed on the plurality of beam signals to obtain a plurality of positive weighting coefficients, where the positive weighting coefficients are indicative of similarity between the plurality of beam signals. The plurality of positive weighting coefficients are multiplied to obtain a combined coefficient. The combined coefficient is multiplied with the frequency domain signal corresponding to any one of the microphones to obtain a weighted spectral component. Inverse time-frequency transforming is performed on the weighted spectral component to obtain a second output signal corresponding to the plurality of microphones.

Compared with the related technologies, in the microphone signal beamforming processing method of the embodiments, the time-frequency transforming is performed on the output signals of the plurality of microphones to obtain the frequency domain signals, so that the frequency distribution of each signal is clear, and the frequency spectrum characteristics of the signal can be more accurately analyzed. Furthermore, the frequency domain signals are subjected to the beamforming processing to obtain the beam signals, which can separately process the sound from different directions and realize the effect of multi-channel sound processing. Thereafter, the similarity between different beam signals is compared based on multiple groups of cross-pattern analysis, to obtain the multiple positive weighting coefficients. The weighted spectral component is obtained by multiplying the positive weighting coefficients with the frequency domain signal of any microphone.

The microphone signal beamforming processing method of the present embodiments realizes better channel separation by using a combined cross-pattern analysis than using a conventional method. In addition, since the present embodiment combines the cross-pattern analysis and the weighting processing, it is possible to enhance the sound signal in a specific direction, thereby improving the signal-to-noise ratio of the signal and obtaining a narrower beam with excellent sidelobe suppression and a higher signal-to-noise ratio.

Realization details of the microphone signal beamforming processing method of the present embodiment may be described in detail below. The following contents are provided for the convenience of understanding only the realization details and are not necessary for implementing the present scheme.

Figure 2:
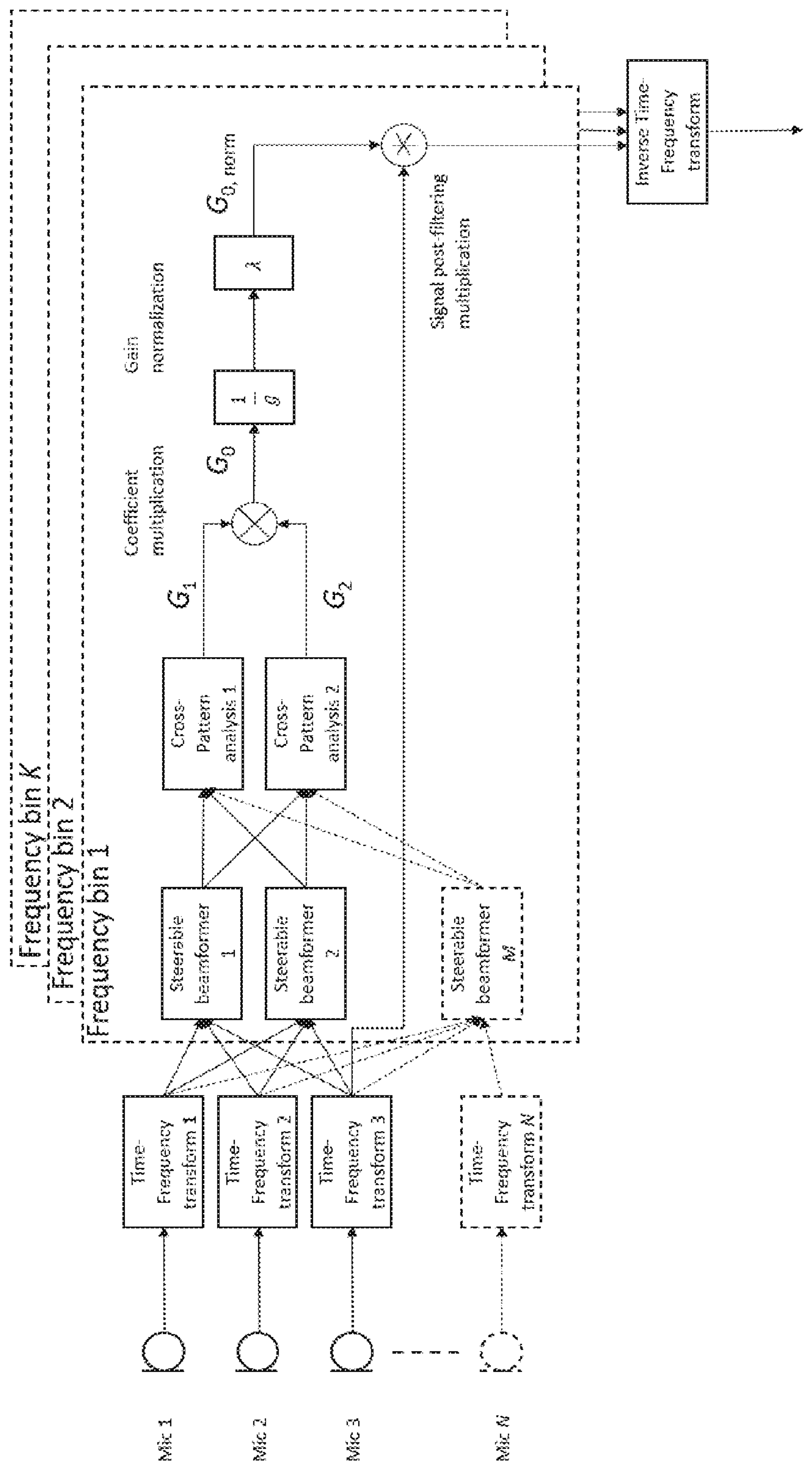
FIG. 2 is a flow chart of the microphone signal beamforming processing method applied to a single microphone group according to embodiments of the present disclosure.

Referring to FIGS. 1 and 2, FIG. 1 is a flow chart of a microphone signal beamforming processing method according to embodiments of the present disclosure. FIG. 2 is a flow chart of the microphone signal beamforming processing method applied to a single microphone group according to embodiments of the present disclosure. The microphone signal beamforming processing method in embodiments of the disclosure begins at block 101.

At block 101, signals collected by a plurality of microphones are processed into frequency domain signals.

Specifically, the plurality of microphones including at least three microphones constitute a microphone group, and first output signals corresponding to all microphones are subjected to time-frequency transforming to obtain frequency domain signals. A distance between each two microphones of the plurality of microphones is less than half of a wavelength (half wavelength) corresponding to a highest frequency in a target application scenario. By setting the distance between the microphones, it is possible to avoid phase difference or signal superposition caused by the distance between the microphones in the collection process of sound waves.

For ease of understanding, some examples of the above-described application scenarios and wavelength corresponding to the frequency are provided herein. In some examples, for the application scenario of speech communication, the frequency of the sound signal to be processed is generally up to 8 kHz. In other examples, for music and general recording application scenarios, a minimum frequency of the sound signal to be processed is at least up to 10 kHz, preferably up to 20 kHz. It shall be understood by those skilled in the art that the "half wavelength corresponding to the highest frequency" described above refer to that the half of a wavelength of a sound wave at these frequencies, for instance, at 10 kHz, would be 17 mm, i.e., a distance between every two microphones needs to be less than 17 mm.

Specifically, referring to FIG. 2, in the embodiments of the disclosure, a plurality of time-frequency transforming modules (time-frequency transforms) in one-to-one correspondence with the plurality of microphones (Mic) are used, such that time-frequency transforming is performed on the first output signal from a respective microphone to obtain the frequency domain signal of the respective microphone. Each frequency domain signal is divided into parts that are respectively fall into a plurality of frequency windows (e.g., Frequency bins 1, 2, . . . , K). In each respective frequency window, part of a respective frequency domain signal, obtained by processing by each time-frequency transforming module, belonging to the respective frequency window is sent to a corresponding beamformer (e.g., steerable beamformer).

Examples of suitable time-frequency transforms include short-time Fourier transform (STFT). The outputs of this transform are complex spectrum components. Each time-frequency transform takes as its input a number of samples from the time-domain output from a single microphone, and the outputs are complex coefficients whose number is equal to the number of the sample points (e.g., 256, 512, 1024). If STFT is used for the time-frequency transform, the plurality of frequency windows are determined according to a sampling frequency for the first output signals and a length of the time-frequency transform. That is, a width of each frequency bin is the sampling frequency divided by the length of the time-frequency transform (i.e., the number of samples).

At block 102, beamforming preprocessing is performed on the frequency domain signals to obtain a plurality of different beam signals.

Specifically, in the operation at block 101, each frequency domain signal is divided into a plurality of parts corresponding, respectively, to the plurality of frequency windows. For a current frequency window, part of each of the frequency domain signals, of the plurality of microphones, belonging to the current frequency window are subjected to different groups of beamforming preprocessing to obtain a plurality of different beam signals corresponding to the current frequency window. For the convenience of illustration, all subsequent operations are carried out within a same frequency window, and for each frequency window, all the subsequent operations may be performed.

Specifically, in the embodiments, a plurality of groups of beamforming preprocessing are performed on the frequency domain signals of the plurality of microphones to obtain the plurality of different beam signals. Specifically, a plurality of beamformers including at least two beamformers are used to perform the plurality of groups of beamforming preprocessing on the frequency domain signals of the plurality of microphones. For each of the at least two beamformers, the beamformer carries out a corresponding group of beamforming preprocessing on frequency domain signals output from at least three time-frequency transforming modules to obtain a corresponding beam signal.

For example, if there are two beamformers (e.g., beamformers 1, 2 in FIG. 2) and three microphones, each of the two beamformers may receive three frequency domain signals respectively output from the plurality of time-frequency transforming modules (e.g., time-frequency transforms 1-3) that are in one-to-one correspondence with the three microphones (Mics 1-3 in FIG. 2), and perform a corresponding set of beamforming preprocessing on the three frequency domain signals to obtain a corresponding beam signal.

In shall be understood that there may be an additional beamformer (e.g., beamformer M), and the additional beamformer may receive additional inputs that may or may not include the at least three frequency domain signals and carries out an additional group of beamforming preprocessing on the inputs (frequency domain signals) to obtain a beam signal.

Herein, each beamformer is a steerable beamformer, and beam signals formed by the at least two beamformers have different widths and/or directions. The beam signals vary according to the physical direction of the incident sound collected by the microphones, and the microphones are spatially separated from each other.

Specifically, referring to FIG. 2, in this embodiment, within the same frequency window (frequency bin), each beamformer (steerable beamformer) receives a corresponding group of frequency domain signals obtained by processing by a corresponding group of time-frequency transforming modules (time-frequency transforms) for obtaining a corresponding beam signal.

It shall be understood that the beamformers and the time-frequency transforms are linear functions, so that the order of execution of the beamformers and the time-frequency transforms can be changed, and thus each steerable beamformer can be connected to any two or more microphones. In some cases, it is found that implementing the beamforming in the frequency domain may be more efficient in computation, and the outputs of the time-frequency transforms can be shared among a plurality of instances of the beamforming algorithm. Therefore, in this embodiment, the time-frequency transforming at block 101 is performed before performing the beamforming at block 102.

At block 103, positive weighting coefficients are obtained based on cross-pattern analysis, and a combined coefficient is obtained based on the positive weighting coefficients.

Specifically, multiple groups of cross-pattern analysis are performed on the plurality of beam signals to obtain a plurality of positive weighting coefficients. Each of the positive weighting coefficients is indicative of similarity between at least two beams signals, among the plurality of beam signals, for a corresponding group of cross-pattern analysis. The function of the cross-pattern analysis is rather well described in the related technologies, which is not described herein. In the present embodiment, the similarity between the plurality of beam signals is compared based on the cross-pattern analysis and methods used for analyzing the similarity include, but are not limited to, coherence or correlation, phase similarity, and the like.

Specifically, referring to FIG. 2, in this embodiment, two independent cross-pattern analysis modules are used to measure and calculate the similarity between the plurality of beam signals, and the methods used for analyzing the similarity include but are not limited to coherence or correlation, phase similarity, and the like. Different positive weighting coefficients $G_1$ and $G_2$ are obtained by the two independent cross-pattern analysis modules.

Specifically, referring to FIG. 2, in this embodiment, a combined coefficient $G_0$ is obtained by performing simple scalar multiplication (corresponding to "coefficient multiplication" of FIG. 2) on the two positive weighting coefficients $G_1$ and $G_2$.

Figure 3:
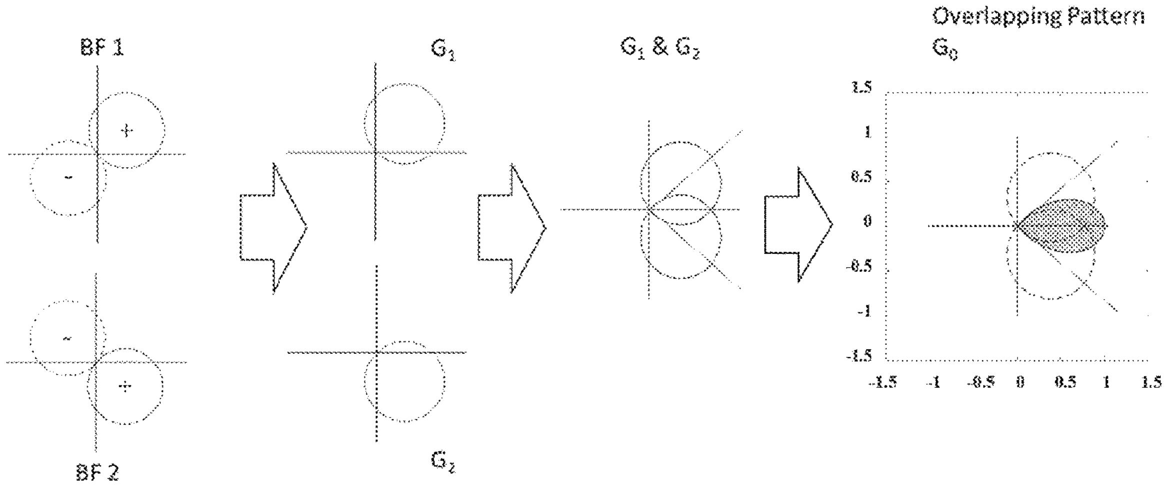
FIG. 3 is an example diagram of a positive weighting coefficient and a combined coefficient processing according to embodiments of the present disclosure.

For ease of understanding, embodiments of the present disclosure provide an example of processing of the positive weighting coefficients and the combined coefficient in operations at block 103, which is illustrated in FIG. 3.

Specifically, in FIG. 3, horizontal and vertical axes on each graph represent spatial components of a directional vector in a plane passing through the acoustic entrances of the microphones (at least three microphones are needed, so their entrances define a plane). A distance between a point on the curve and the origin represents the amplitude. The graphs on the leftmost side of FIG. 3 represent two acquired beam signals BF1 and BF2 output from the beamformers, where plus and minus signs in FIG. 3 refer to the phase of the two lobes of the microphones. Thereafter, the two beam signals BF1 and BF2 are inputted into two independent cross-pattern analysis modules, and thus two different positive weighting coefficients $G_1$ and $G_2$ are obtained, as shown in graph on the secondary left side of FIG. 3. The two positive weighting coefficients $G_1$ and $G_2$ are plotted on the same graph, as shown in the graph "$G_1$&$G_2$" on the secondary right side of FIG. 3. Thereafter, the two positive weighting coefficients $G_1$ and $G_2$ are subjected to the simple scalar multiplication (corresponding to "coefficient multiplication" in FIG. 2), to obtain the combined coefficient $G_0$, which is the shaded part in the graph "overlapping pattern $G_0$" on the rightmost side in FIG. 3. $G_0$ is the narrower polar pattern for the control signal obtained by multiplying $G_1$ and $G_2$.

Figure 4:
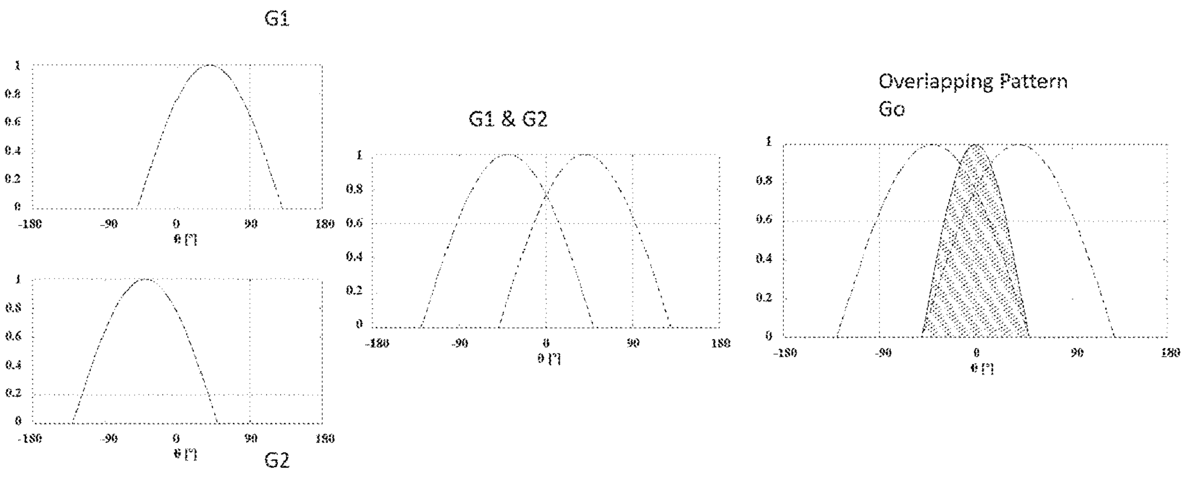
FIG. 4 is a functional diagram of positive weighting coefficients and combined coefficients according to embodiments of the present disclosure.

Referring to FIG. 4, FIG. 4 is a functional diagram of the positive weighting coefficients $G_1$ and $G_2$ and the combined coefficient $G_0$ in the present embodiment.

Specifically, in FIG. 4, the horizontal axis of each subgraph represents the direction of incident sound (angle θ), and the vertical axis represents the weight function value of each coefficient. The left subgraph of FIG. 4 illustrates weight function values of the weighting coefficients $G_1$ and $G_2$ from the initial cross-pattern analysis. As shown in the middle subgraph $G_1$&$G_2$, the obtained two positive weighting coefficients $G_1$ and $G_2$ are plotted on the same graph. The two positive weighting coefficients $G_1$ and $G_2$ are subjected to the simple scalar multiplication, to obtain a weight function value of the combined coefficient $G_0$ corresponding to the narrower beam pattern obtained by combining $G_1$ and $G_2$, as shown in the right subgraph of FIG. 4.

At block 104, the combined coefficient is multiplied with any one of the frequency domain signals to obtain a weighted spectral component.

Specifically, after the combined coefficient $G_0$ is obtained by performing the simple scalar multiplication on the two positive weighting coefficients $G_1$ and $G_2$, the combined coefficient is subjected to gain normalization processing based on a gain normalization factor 1/g and a floor value λ for selectively suppressing inputs in a direction of cross-mode similarity below a predetermined threshold to obtain the desired (e.g., unity) gain towards the main lobe direction of the generated beam.

Referring to FIG. 2, as shown in the "Gain normalization" of FIG. 2, after completing the gain normalization processing based on the gain normalization factor 1/g and the floor value 1, a combined coefficient $G_{0,norm}$ is obtained. Thereafter, the simple scalar multiplication is performed on the combined coefficient $G_{0,norm}$ and the frequency domain signal obtained after signal processing by any microphone (e.g., as illustrated in "Signal post-filtering multiplication" in FIG. 2), so as to obtain a weighted spectral component.

In the "Signal post-filtering multiplication" of FIG. 2 provided in this embodiment, the frequency domain signal output from time-frequency transform 3 corresponding to microphone 3 (Mic 3) is used as a multiplier of the signal multiplication operation, and the output of time-frequency transform 3 inputted into the signal multiplier for the signal multiplication operation is an example of a possible arrangement. The key point is to have one, and only one, of the frequency domain signals output from the time-frequency transforms, inputted into the signal multiplier which is controlled by the coefficient $G_{0,norm}$, to complete the signal multiplication operation, thereby obtaining the weighted spectral component.

At block 105, inverse time-frequency transforming is performed on the weighted spectral component to obtain an output signal.

Specifically, referring to FIG. 2, a weighted spectral component corresponding to each frequency window is obtained to obtain a plurality of weighted spectral components, and the inverse time-frequency transforming is performed on all the weighted spectral components to obtain the second output signal corresponding to the plurality of microphones.

The inverse time-frequency transform takes as its input the weighted spectral components (complex numbers). That is, the number of inputs is the same as the number of outputs of the original (non-inverse) time-frequency transforms, and the output is a real valued time domain signal.

In embodiments of the disclosure, the frequency domain signals are acquired by performing the time-frequency transforming on the output signals of the multiple microphones. The beamforming processing is performed on the frequency domain signals to obtain beam signals. The similarity of different beam signals is compared based on the plurality of groups of cross-pattern analysis, to obtain the multiple positive weighting coefficients. The positive weighting coefficients are then multiplied by the frequency domain signal of any microphone to obtain a weighted spectral component, thereby obtaining a narrower beam with excellent sidelobe suppression and a higher signal-to-noise ratio. In addition, in embodiments of the disclosure, multiple beams pointed to different directions using the same physical microphone array are generated by using additional beamformers and adopting the cross-pattern analysis functions. In these use cases, channel separation is better achieved using combined cross-pattern analysis than using traditional methods.

Furthermore, it shall be understood by those skilled in the art that the scope of use of the disclosure can be extended to situations where two or more physically separated microphone groups exist in a system, the groups being located in different parts of the same device (e.g., a computer or augmented reality/virtual reality glasses) or in physically separated units (e.g., both sides of a headsets system are connected via electrical connection or via a wireless interface), and in such case, the beamforming processing may be distributed.

Based on this, embodiments of the present disclosure further provide a microphone signal beamforming processing method. This embodiment is substantially the same as the previous embodiments, with the main difference that in the previous embodiments, the microphone signal beamforming processing method is applied to a single closely spaced audio signal sensor group including a plurality of microphones. In the present embodiment, the method is applied to two spatially separated microphone groups or a plurality of independent microphone groups.

Figure 5:
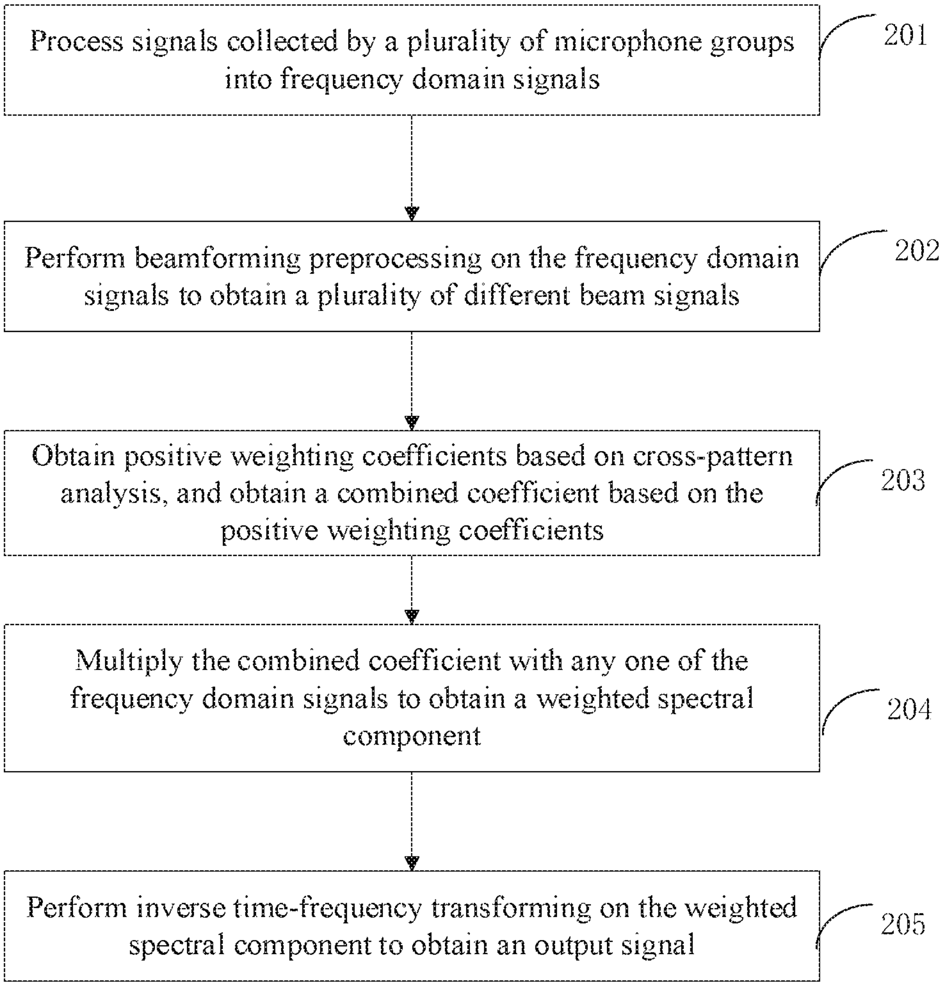
FIG. 5 is a flow chart of a microphone signal beamforming processing method according to other embodiments of the present disclosure.
Figure 6:
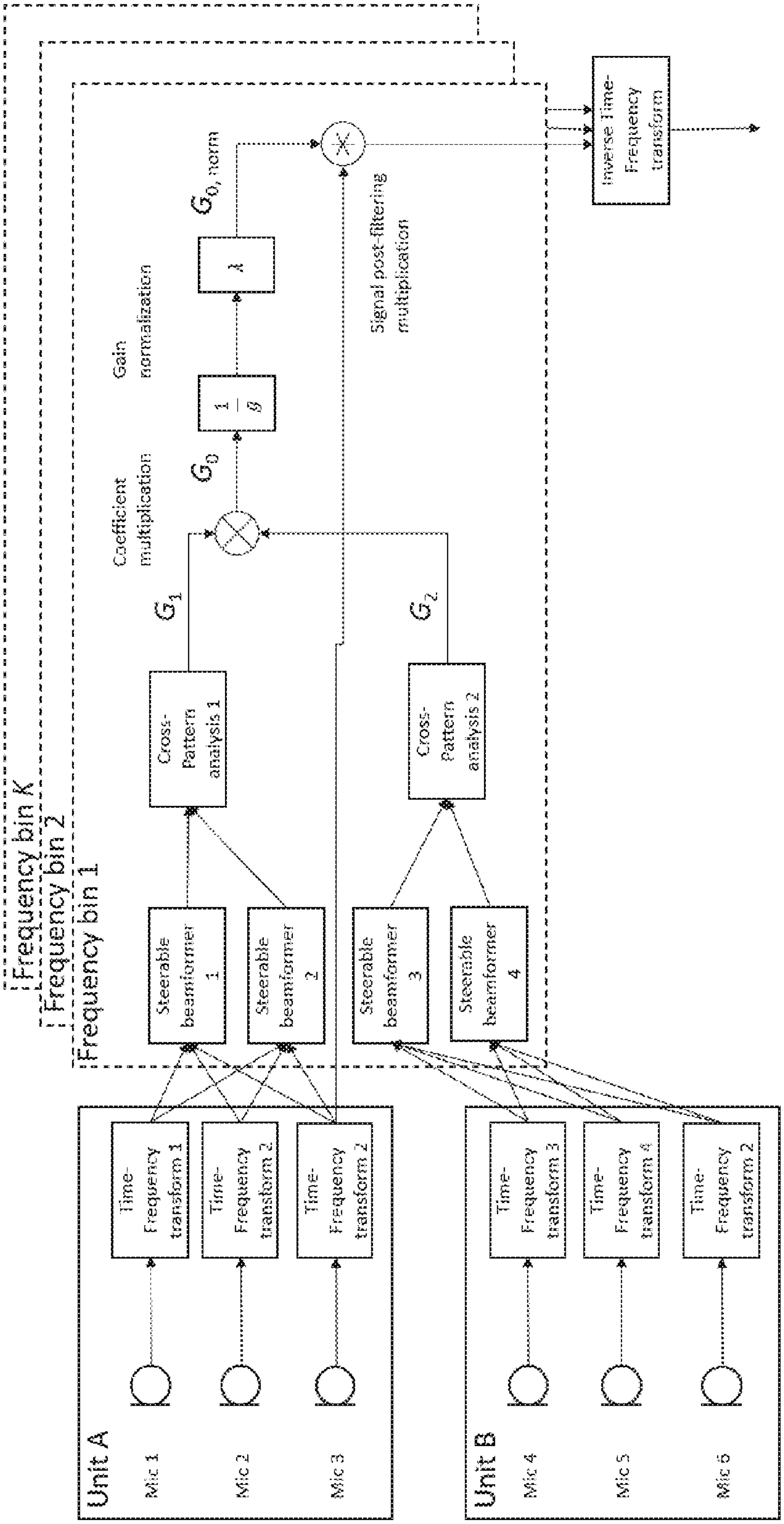
FIG. 6 is a flow chart of the microphone signal beamforming processing method applied to multiple microphone groups according to embodiments of the present disclosure.

Referring to FIGS. 5 and 6, FIG. 5 is a flow chart of a microphone signal beamforming processing method according to other embodiments of the present disclosure, and FIG. 6 is a flow chart of the microphone signal beamforming processing method applied to multiple microphone groups according to embodiments of the present disclosure. As illustrated in FIG. 5, the method begins at block 201.

At block 201, signals collected by a plurality of microphone groups are processed into frequency domain signals.

Specifically, each microphone group including at least three microphones, and the time-frequency transforming is performed on the first output signals of the plurality of microphones in each microphone group to obtain frequency domain signals. A distance between each two microphones of the plurality of microphones is less than half wavelength corresponding to a highest frequency in a target application scenario. By setting the distance between the microphones, it is possible to avoid phase difference or signal superposition caused by the distance between the microphones in the collection process of sound waves.

Specifically, referring to FIG. 6, there are two microphone groups A and B, and each microphone group includes three microphones. It shall be understood that the microphone group shown in FIG. 6 is an example and the method of the present embodiment may involve more microphone groups and each microphone group may further include more than three microphones.

Specifically, referring to FIG. 6, for each microphone group, in embodiments of the disclosure, a plurality of time-frequency transforming modules (time-frequency transforms) in one-to-one correspondence with the plurality of microphones (Mic) are used, such that the time-frequency transforming is performed on the first output signal from each microphone to obtain the frequency domain signal of each microphone. Each frequency domain signal is divided into parts that are respectively fall into a plurality of frequency windows (e.g., Frequency bins 1, 2, . . . , K). In each respective frequency window, part of a respective frequency domain signal, obtained by processing by each time-frequency transforming module of each respective microphone group, belonging to the respective frequency window is sent to all beamformers corresponding to the respective microphone group for convenience of subsequent processing.

At block 202, beamforming preprocessing is performed on the frequency domain signals to obtain a plurality of different beam signals.

Specifically, in the operation at block 201, each frequency domain signal is divided into the plurality of parts belonging to the plurality of frequency windows. Within a current frequency window, part of each of the frequency domain signals, of the plurality of microphones, belonging to the current frequency window are together subjected to different groups of beamforming preprocessing to obtain a plurality of different beam signals corresponding to the current frequency window.

For the convenience of illustration, all subsequent operations are carried out within a same frequency window, and for each frequency window, all the subsequent operations may be performed.

Specifically, in the present embodiment, for each microphone group, at least two beamformers may be used to perform a plurality of different groups of beamforming preprocessing on the frequency domain signals of the plurality of microphones included in the microphone group. Each of the at least two beamformers carries out a corresponding group of beamforming preprocessing on frequency domain signals output by at least three time-frequency transforming modules, to obtain one beam signal. Herein, each beamformer is a steerable beamformer, and beam signals formed by the at least two beamformers have different widths and/or directions. The beam signals vary according to the physical direction of the incident sound collected by the microphones, and the microphones are spatially separated from each other.

Specifically, referring to FIG. 6, in this embodiment, within the same frequency window (frequency bin), each beamformer (steerable beamformer) receives a group of frequency domain signals obtained by processing by all time-frequency transforming modules (time-frequency transform) corresponding to a respective microphone group, to obtain a corresponding beam signal.

It shall be understood that the beamformers and the time-frequency transforms are linear functions, so that the order of execution of the beamformers and the time-frequency transforms can be changed, and thus each steerable beamformer can be connected to any two or more microphones. In some cases, it is found that implementing the beamforming in the frequency domain may be more efficient in computation, and the outputs of the time-frequency transforms can be shared among a plurality of instances of the beamforming algorithm. Therefore, in this embodiment, the time-frequency transforming at block 201 is performed before performing the beamforming at block 202.

At block 203, positive weighting coefficients are obtained based on cross-pattern analysis, and a combined coefficient is obtained based on the positive weighting coefficients.

Specifically, the plurality of beam signals are subjected to multiple groups of cross-pattern analysis to obtain a plurality of positive weighting coefficients. The positive weighting coefficients are indicative of similarity between the plurality of beam signals. The function of cross-pattern analysis is rather well described in the related technologies, which is not described herein. In the present embodiment, the similarity between the plurality of beam signals is compared based on the cross-pattern analysis and methods used for analyzing the similarity include, but are not limited to, coherence or correlation, phase similarity, and the like.

Specifically, referring to FIG. 6, in this embodiment, each of two independent cross-pattern analysis modules is used to measure and calculate similarity between a plurality of beam signals corresponding to a respective microphone group of the two microphone groups, and the methods used for analyzing the similarity include but are not limited to coherence or correlation, phase similarity, and the like. Different positive weighting coefficients $G_1$ and $G_2$ are obtained by the two independent cross-pattern analysis modules.

Specifically, referring to FIG. 6, in the present embodiment, a combined coefficient $G_0$ is obtained by performing simple scalar multiplication (corresponding to "coefficient multiplication" in FIG. 6) on the two positive weighting coefficients $G_1$ and $G_2$.

Referring to FIG. 3, FIG. 3 is a diagram of an example of a processing process of the operations at S103.

In FIG. 3, horizontal and vertical axes on each graph represent spatial components of directional vector in a plane passing through the acoustic entrances of the microphones (each microphone group includes at least three microphones, so their entrances define a plane). A distance between a point on the curve and the origin represents the amplitude.

The graphs on the leftmost side of FIG. 3 represent two acquired beam signals BF1 and BF2 output from the beamformers, where plus and minus signs in FIG. 3 refer to the phase of the two lobes of the microphones. Thereafter, the two beam signals BF1 and BF2 are inputted into two independent cross-pattern analysis modules, and thus two different positive weighting coefficients $G_1$ and $G_2$ are obtained, as shown in graph on the secondary left side of FIG. 3. The two positive weighting coefficients $G_1$ and $G_2$ are plotted on the same graph, as shown in the graph "$G_1$&$G_2$" on the secondary right side of FIG. 3. Thereafter, the two positive weighting coefficients $G_1$ and $G_2$ are subjected to simple scalar multiplication (corresponding to "coefficient multiplication" in FIG. 6), to obtain the combined coefficient $G_0$, which is the shaded part in the graph "overlapping pattern $G_0$" on the rightmost side in FIG. 3. $G_0$ is the narrower polar pattern for the control signal obtained by multiplying $G_1$ and $G_2$.

Referring to FIG. 4, FIG. 4 is a functional expression of the positive weighting coefficients $G_1$ and $G_2$ and the combined coefficient $G_0$ in the present embodiment.

In FIG. 4, the horizontal axis of each subgraph represents the direction of incident sound (angle θ), and the vertical axis represents the weight function value of each coefficient.

Specifically, the left subgraph of FIG. 4 illustrates weight function values of the weighting coefficients $G_1$ and $G_2$ from the initial cross-pattern analysis. As shown in the middle subgraph $G_1$&$G_2$, the obtained two positive weighting coefficients $G_1$ and $G_2$ are plotted on the same graph. The two positive weighting coefficients $G_1$ and $G_2$ are subjected to the simple scalar multiplication, to obtain a weight function value of the combined coefficient $G_0$, as shown in the right subgraph of FIG. 4.

Figure 7:
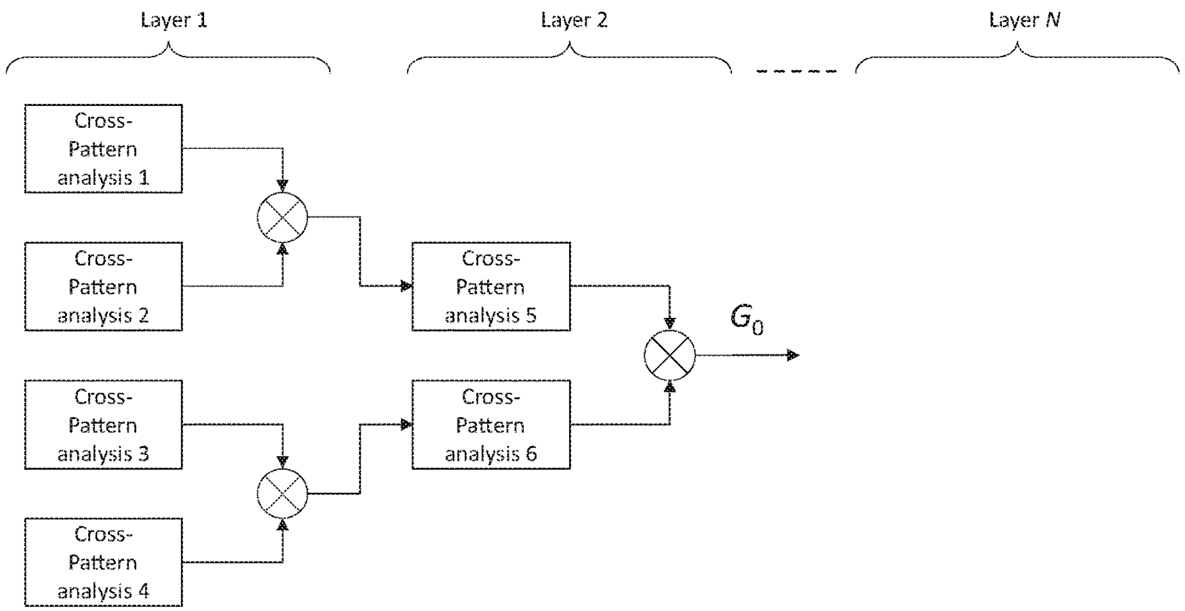
FIG. 7 is a structural schematic diagram of multi-layer cross-pattern analysis according to embodiments of the present disclosure.

If more microphone groups are needed or more positive weighting coefficients need to be obtained, more cross-pattern analysis layers can be added, as shown in FIG. 7. This enables further reduction of beamwidth and the creation of a wider null region. The benefit of this approach, as compared to using higher order beamformers in the preprocessing stage is that the artefacts of simple high-order beamformers do not affect the end result, although some noise gain can be expected. As shown in FIG. 7, FIG. 7 is a structural schematic diagram of multi-layer cross-pattern analysis according to embodiments of the present disclosure.

Specifically, when there are multiple cross-pattern analysis layers, the number of cross-pattern analysis modules in each layer should be an integer multiple of 2, and every two independent cross-pattern analysis modules is regarded as a group of cross-pattern analysis modules. The initial inputs of the multiple cross-pattern analysis layers are the beam signal processed by the beamformers, and each cross-pattern analysis module outputs a corresponding positive weighting coefficient, and combined coefficients are obtained by performing simple scalar multiplication on positive weighting coefficients obtained by each group of cross-pattern analysis modules. Thereafter, the combined coefficients are used as the inputs of a next layer of cross-pattern analysis modules. The above operations are repeated to obtain a final combined coefficient.

At block 204, the combined coefficient is multiplied with one of the frequency domain signals to obtain a weighted spectral component.

Specifically, after the combined coefficient $G_0$ is obtained by performing the simple scalar multiplication (corresponding to "coefficient multiplication" in FIG. 6) on the two positive weighting coefficients $G_1$ and $G_2$, and the combined coefficient is subjected to gain normalization processing based on a gain normalization factor 1/g and the floor value λ for selectively suppressing inputs in a direction of cross-mode similarity below a predetermined threshold to obtain the desired (e.g., unity) gain towards the main lobe direction of the generated beam.

Referring to FIG. 6, as shown in the "Gain normalization" of FIG. 6, after completing the gain normalization processing based on the gain normalization factor 1/g and the floor value λ, a combined coefficient $G_{0,norm}$ is obtained. Thereafter, the simple scalar multiplication is performed on the combined coefficient $G_{0,norm}$ and the frequency domain signal obtained after signal processing by any microphone in any microphone group (e.g., as illustrated in "Signal post-filtering multiplication" in FIG. 6), so as to obtain a weighted spectral component.

In the "Signal post-filtering multiplication" of FIG. 6 provided in this embodiment, the frequency domain signal output from time-frequency transform 3 corresponding to microphone 3 (Mic 3) in microphone group A (unit A) is used as a multiplier of multiplication operation, and the output of time-frequency transform 3 inputted into the signal multiplier for the signal multiplication operation is an example of a possible arrangement. The key point is to have one, and only one, of the frequency domain signals output from the time-frequency transforms, inputted into the signal multiplier which is controlled by the coefficient $G_{0,norm}$, to complete the multiplication operation, thereby obtaining the weighted spectral component.

At block 205, inverse time-frequency transforming is performed on the weighted spectral component to obtain an output signal.

Specifically, referring to FIG. 6, a weighted spectral component corresponding to each frequency window is obtained to obtain a plurality of weighted spectral components, the plurality of weighted spectral components are combined and then subjected to the inverse time-frequency transforming to obtain the second output signal corresponding to the plurality of microphones.

In embodiments of the disclosure, the frequency domain signals are acquired by performing the time-frequency transforming on the output signals of multiple microphones in each of the plurality of microphone groups. The beamforming processing is performed on the frequency domain signals to obtain the beam signals. The similarity of different beam signals is compared based on the plurality of groups of cross-pattern analysis, to obtain the multiple positive weighting coefficients. The positive weighting coefficients are then multiplied by the frequency domain signal of any microphone to obtain the weighted spectral component, thereby obtaining a narrower beam with excellent sidelobe suppression and a higher signal-to-noise ratio. In addition, in embodiments of the disclosure, multiple beams pointed to different directions (for example, for multi-channel (surround sound) recording applications) using the same physical microphone array are generated by using additional beamformers and adopting the cross-pattern analysis functions. In these use cases, channel separation is better achieved using combined cross-pattern analysis than using traditional methods.

The division of steps of the above methods is only for the sake of clear description, and the above steps can be combined into one step or some steps may be split into multiple steps when implemented, as long as the same logical relationship is included, it is within the protection scope of this patent. Adding insignificant modifications or introducing insignificant designs into algorithms or processes without changing the core designs of their algorithms and processes are within the scope of protection of this disclosure.

Figure 8:
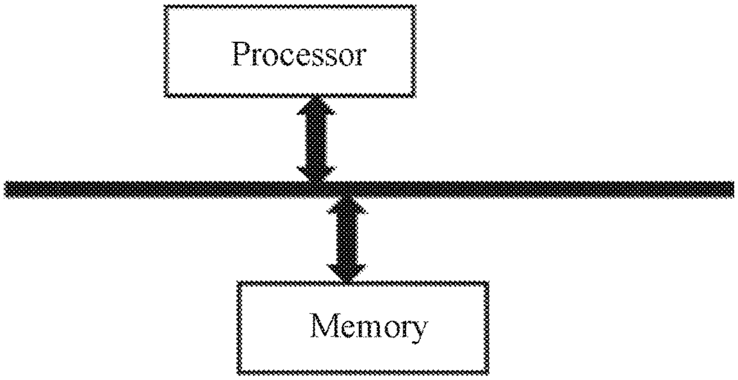
FIG. 8 is a schematic structural diagram of an electronic device according to embodiments of the present disclosure.

Embodiments of the disclosure further relate to an electronic device, as shown in FIG. 8, including at least one processor; and a memory in communication with the at least one processor. The memory stores computer programs or instructions executable by the at least one processor, and the computer programs or instructions, when executed by the at least one processor, cause the at least one processor to perform the microphone signal beamforming processing method as described above.

The memory and the processor are connected via a bus, and the bus may include any number of interconnected buses and bridges, and the bus connects one or more processors and various circuits of the memory together. The bus may also connect together a variety of other circuitry such as peripherals voltage, regulators, and power management circuitry which are well known in the art and therefore will not be further described herein. The bus interface provides an interface between the bus and a transceiver. The transceiver may be one element or a plurality of elements such as a plurality of receivers and transmitters that provide a unit for communicating with various other devices over a transmission medium. The data processed by the processor is transmitted over the wireless medium through the antenna, and further, the antenna receives the data and transmits the data to the processor.

The processor is responsible for managing the bus and general processing, and can also provide various functions, including timing, peripheral interface, voltage regulation, power management, and other control functions. The memory can be used to store data used by the processor when performing operations.

Embodiments of the disclosure further relate to a non-transitory computer-readable storage medium having a computer program stored therein. The above method embodiments are implemented when a computer program is executed by a processor.

That is, it shall be understood by those skilled in the art that all or part of the steps in implementing the method of the above embodiments can be accomplished by instructing related hardware through a program stored in a storage medium and including instructions for causing a device (which may be a single chip microcomputer, chip, etc.) or a processor (processor) to perform all or part of the steps of the method described in various embodiments of the disclosure. The aforementioned storage medium includes a U disk, a removable hard disk, a read-only memory (ROM), a random-access memory (RAM), a magnetic disk, or an optical disk and other media capable of storing program codes.

It shall be understood that when used in the present specification and the appended claims, the term "including" indicates the presence of the described feature, entirety, step, operation, element, and/or component, but does not exclude the presence or addition of one or more other features, entirety, step, operation, element, component, and/or collections thereof.

In addition, in the description of the present specification and the appended claims, the terms "first," "second," "third," etc. are used to distinguish descriptions only and are not understood to indicate or imply relative importance.

Those of ordinary skill in the art will appreciate that the above-described embodiments are specific embodiments for implementing the present disclosure, and that in practical situations, various changes in form and detail may be made thereto without departing from the spirit and scope of the present disclosure.

What is claimed is:

1. A microphone signal beamforming processing method, comprising:

obtaining a frequency domain signal of each of at least three microphones by performing time-frequency transforming on a first output signal of each of the at least three microphones to obtain frequency domain signals, and performing a plurality of different groups of beamforming preprocessing on the frequency domain signals to obtain a plurality of different beam signals;

performing a plurality of different groups of cross-pattern analysis on the plurality of beam signals to obtain a plurality of positive weighting coefficients, wherein each of the positive weighting coefficients is indicative of similarity between at least two beams signals, among the plurality of beam signals, for a corresponding group of cross-pattern analysis;

multiplying the plurality of positive weighting coefficients to obtain a combined coefficient, and multiplying the combined coefficient with the frequency domain signal of any one of the at least three microphones to obtain a weighted spectral component; and performing inverse time-frequency transforming on the weighted spectral component to obtain a second output signal corresponding to the at least three microphones.

2. The microphone signal beamforming processing method of claim 1, wherein a distance between each two microphones of the at least three microphones is less than half of a wavelength corresponding to a highest frequency in a target application scenario.

3. The microphone signal beamforming processing method of claim 1, wherein obtaining the frequency domain signal of each of the at least three microphones by performing the time-frequency transforming on the first output signal of each of the at least three microphones to obtain the frequency domain signals comprises:

performing, by each respective time-frequency transforming module of a plurality of time-frequency transforming modules that are in one-to-one correspondence with the at least three microphones, the time-frequency transforming on a first output signal of a respective microphone to obtain the frequency domain signal of the respective microphone.

4. The microphone signal beamforming processing method of claim 3, wherein performing the plurality of different groups of beamforming preprocessing on the frequency domain signals to obtain the plurality of beam signals comprises:

performing, by at least two beamformers, the plurality of different groups of beamforming preprocessing on the frequency domain signals, including:

performing, by each of the at least two beamformers, a corresponding group of beamforming preprocessing on frequency domain signals output from at least three time-frequency transforming modules of the plurality of time-frequency transforming modules to obtain a beam signal.

5. The microphone signal beamforming processing method of claim 4, wherein each beamformer is a steerable beamformer, and wherein the beam signals formed by the at least two beamformers have different widths and/or directions.

6. The microphone signal beamforming processing method of claim 1, wherein performing the plurality of different groups of cross-pattern analysis on the plurality of beam signals to obtain the plurality of positive weighting coefficients comprises:

performing, by two cross-pattern analysis modules, measuring and calculation on correlation and/or coherence between the plurality of beam signals respectively to obtain the plurality of positive weighting coefficients.

7. The microphone signal beamforming processing method of claim 1, wherein the method further comprises:

before multiplying the combined coefficient with the frequency domain signal of any one of the at least three microphones, performing gain normalization processing on the combined coefficient based on a gain normalization factor and a floor value, to obtain a desired gain towards a main lobe direction of a generated beam.

8. The microphone signal beamforming processing method of claim 1, wherein performing the plurality of different groups of beamforming preprocessing on the frequency domain signals, performing the plurality of different groups of cross-pattern analysis on the plurality of beam signals, multiplying the plurality of positive weighting coefficients to obtain the combined coefficient, multiplying the combined coefficient with the frequency domain signal of any one of the at least three microphones to obtain the weighted spectral component, and performing the inverse time-frequency transforming on the weighted spectral component, comprise:

dividing each of the frequency domain signals into a plurality of parts that are respectively falls into a plurality of frequency widows, wherein the plurality of frequency widows are determined according to a sampling frequency for the first output signals and a length of each time-frequency transforming module;

for each respective frequency widow of the plurality of frequency widows, performing the plurality of different groups of beamforming preprocessing on part of each of the frequency domain signals belonging to the respective frequency window to obtain a plurality of different first beam signals;

performing the plurality of different groups of cross-pattern analysis on the plurality of first beam signals to obtain a plurality of first positive weighting coefficients; and multiplying the plurality of first positive weighting coefficients to obtain a first combined coefficient, and multiplying the first combined coefficient with part of the frequency domain signal of any one of the microphones belonging to the respective frequency window to obtain a first weighted spectral component; and performing the inverse time-frequency transforming on combined first weighted spectral components corresponding to the plurality of frequency widows to obtain the second output signal corresponding to the at least three microphones.

9. An electronic device comprising:

at least one processor; and a memory in communication with the at least one processor; wherein the memory is configured to store instructions executable by the at least one processor, and the instructions, when executed by the at least one processor, causes the at least one processor to perform the microphone signal beamforming processing method of claim 1.

10. The electronic device of claim 9, wherein a distance between each two microphones of the at least three microphones is less than half of a wavelength corresponding to a highest frequency in a target application scenario.

11. The electronic device of claim 9, wherein the instructions, when executed by the at least one processor, cause the at least one processor to:

perform the time-frequency transforming on a first output signal of a respective microphone to obtain the frequency domain signal of the respective microphone.

12. A non-transitory computer-readable storage medium, having a computer program stored therein, wherein the computer program, when executed by at least one processor, causes the at least one processor to perform the microphone signal beamforming processing method of claim 1.

13. The non-transitory computer-readable storage medium of claim 12, wherein a distance between each two microphones of the at least three microphones is less than half of a wavelength corresponding to a highest frequency in a target application scenario.

14. The non-transitory computer-readable storage medium of claim 12, wherein the computer program, when executed by the at least one processor, causes the at least one processor to:

perform the time-frequency transforming on a first output signal of a respective microphone to obtain the frequency domain signal of the respective microphone.

* * * * *